United States Patent
Wang et al.

(10) Patent No.: US 10,772,021 B2
(45) Date of Patent: Sep. 8, 2020

(54) LOW LATENCY AND/OR ENHANCED COMPONENT CARRIER DISCOVERY FOR SERVICES AND HANDOVER

(71) Applicant: QUALCOMM Incorporated, San Diego, CA (US)

(72) Inventors: Jun Wang, Poway, CA (US); Ozcan Ozturk, San Diego, CA (US); Madhavan Srinivasan Vajapeyam, San Diego, CA (US); Ravindra Manohar Patwardhan, San Diego, CA (US); Miguel Griot, San Diego, CA (US); Onkar Jayant Dabeer, San Diego, CA (US); Jelena Damnjanovic, Del Mar, CA (US); Aleksandar Damnjanovic, Del Mar, CA (US); Taesang Yoo, Riverside, CA (US); Yongbin Wei, La Jolla, CA (US); Durga Prasad Malladi, San Diego, CA (US); Ajay Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/957,255

(22) Filed: Dec. 2, 2015

(65) Prior Publication Data
US 2016/0192261 A1 Jun. 30, 2016

Related U.S. Application Data

(60) Provisional application No. 62/088,258, filed on Dec. 5, 2014.

(51) Int. Cl.
*H04W 36/16* (2009.01)
*H04W 74/08* (2009.01)
(Continued)

(52) U.S. Cl.
CPC ........ *H04W 36/16* (2013.01); *H04W 36/0011* (2013.01); *H04W 36/0055* (2013.01);
(Continued)

(58) Field of Classification Search
CPC ........ H04W 36/0072; H04W 36/0055; H04W 4/22; H04W 72/04; H04W 8/22;
(Continued)

(56) References Cited

U.S. PATENT DOCUMENTS 9,253,704 B1 * 2/2016 Sarkar .................... H04W 36/30
9,264,961 B1 * 2/2016 Shah .................. H04W 36/0072
(Continued)

FOREIGN PATENT DOCUMENTS

CN 101971667 A 2/2011
CN 102986273 A 3/2013
(Continued)

OTHER PUBLICATIONS

International Search Report and Written Opinion—PCT/US2015/063705—ISA/EPO—dated Feb. 23, 2016.
Taiwan Search Report—TW104140529—TIPO—dated May 7, 2019.

*Primary Examiner* — Michael Thier
*Assistant Examiner* — Prince A Mensah
(74) *Attorney, Agent, or Firm* — Patterson & Sheridan, L.L.P

(57) ABSTRACT

Certain aspects relate to methods and apparatus for discovering whether one or more enhanced capabilities are supported by devices (e.g., user equipment (UE), base station (BS), etc.) in a network. The enhanced capabilities may include, for example, the ability to support certain low latency procedures, enhanced component carrier (eCC) capability, and the like. The devices in the network may perform one or more handover-related procedures (e.g., cell selection/reselection, make-before-break handover, etc.)

(Continued)

and/or other procedures (e.g., QoS negotiation, etc.) based, at least in part, on support for the one or more enhanced capabilities.

22 Claims, 11 Drawing Sheets

(51) Int. Cl.
| | |
|---|---|
| *H04W 36/00* | (2009.01) |
| *H04W 36/30* | (2009.01) |
| *H04W 36/36* | (2009.01) |
| *H04W 36/26* | (2009.01) |
| *H04W 8/22* | (2009.01) |
| *H04W 84/04* | (2009.01) |

(52) U.S. Cl.
CPC ........... *H04W 36/30* (2013.01); *H04W 36/36* (2013.01); *H04W 74/0833* (2013.01); *H04W 8/22* (2013.01); *H04W 36/0027* (2013.01); *H04W 36/0072* (2013.01); *H04W 36/26* (2013.01); *H04W 84/045* (2013.01)

(58) Field of Classification Search
CPC . H04W 36/0011; H04W 36/16; H04W 36/26; H04W 36/0027; H04W 36/30; H04W 36/36; H04W 84/045
See application file for complete search history.

(56) References Cited

U.S. PATENT DOCUMENTS

| | | | |
|---|---|---|---|
| 2004/0203831 A1 | 10/2004 | Khan | |
| 2009/0325578 A1* | 12/2009 | Li | H04W 36/0055 455/436 |
| 2010/0272067 A1* | 10/2010 | Lu | H04W 36/0072 370/331 |
| 2012/0002643 A1 | 1/2012 | Chung et al. | |
| 2012/0113943 A1 | 5/2012 | Jung et al. | |
| 2012/0218889 A1* | 8/2012 | Watfa | H04W 60/04 370/230 |
| 2013/0028236 A1 | 1/2013 | Jung et al. | |
| 2013/0102270 A1* | 4/2013 | Suh | H04W 4/22 455/404.1 |
| 2013/0183974 A1* | 7/2013 | Johansson | H04W 76/18 455/436 |
| 2013/0301591 A1* | 11/2013 | Meyer | H04W 74/0833 370/329 |
| 2014/0119206 A1* | 5/2014 | Vargantwar | H04W 56/00 370/252 |
| 2014/0241265 A1* | 8/2014 | Pragada | H04W 72/04 370/329 |
| 2014/0241317 A1* | 8/2014 | Jamadagni | H04W 76/025 370/331 |
| 2014/0357275 A1* | 12/2014 | Quan | H04W 36/0094 455/436 |
| 2015/0131535 A1* | 5/2015 | Wallentin | H04W 76/15 370/329 |
| 2016/0057784 A1* | 2/2016 | You | H04W 88/04 370/329 |

FOREIGN PATENT DOCUMENTS

| | | |
|---|---|---|
| EP | 2373090 A1 | 10/2011 |
| EP | 2566246 A2 | 3/2013 |
| JP | 2007150706 A | 6/2007 |
| JP | 2009542063 A | 11/2009 |
| JP | 2011223584 A | 11/2011 |
| JP | 2012525027 A | 10/2012 |
| JP | 2012533208 A | 12/2012 |
| WO | 2007147703 A1 | 12/2007 |
| WO | 2010121569 A1 | 10/2010 |
| WO | 102014131159 A1 | 9/2014 |

* cited by examiner

LOW LATENCY AND/OR ENHANCED COMPONENT CARRIER DISCOVERY FOR SERVICES AND HANDOVER

CROSS-REFERENCE TO RELATED APPLICATION(S)

This application claims the benefit of U.S. Provisional Application Ser. No. 62/088,258, entitled, "LOW LATENCY AND/OR ENHANCED CHANNEL COMPONENT DISCOVERY FOR SERVICES AND HANDOVER," filed Dec. 5, 2014, assigned to the assignee hereof and hereby expressly incorporated by reference herein.

BACKGROUND

Field

Certain aspects of the present disclosure generally relate to wireless communications and, more specifically, to methods and apparatus for performing handover and/or services based on support for one or more enhanced capabilities.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (BSs) that can support communication for a number of user equipments (UEs). A UE may communicate with a BS via the downlink and uplink. The downlink (or forward link) refers to the communication link from the BS to the UE, and the uplink (or reverse link) refers to the communication link from the UE to the BS. A BS may transmit data and control information on the downlink to a UE and/or may receive data and control information on the uplink from the UE.

Current procedures for handover of a UE from a source (serving) BS to a target BS involve a relatively large latency between the time a UE initiates and actually gains access. Further, different BSs may have different capabilities to support certain enhanced features of a UE. Reducing this latency and ensuring suitable enhanced capabilities are supported at a target BS are desirable.

SUMMARY

Certain aspects of the present disclosure provide a method of wireless communication by a user equipment (UE). The method generally includes signaling one or more enhanced capabilities of the UE to at least one source base station, and performing one or more handover-related procedures based, at least in part, on the one or more enhanced capabilities of the UE and support for the one or more enhanced capabilities of the UE at a target base station. The one or more enhanced capabilities of the UE include at least one of a capability of the UE to perform handover with low latency relative to devices that lack the one or more enhanced capabilities, or a capability of the UE to support enhanced component carrier operation.

Certain aspects of the present disclosure provide an apparatus for wireless communication. The apparatus generally includes means for signaling one or more enhanced capabilities of the apparatus to at least one source base station, and performing one or more handover-related procedures based, at least in part, on the one or more enhanced capabilities of the apparatus and support for the one or more enhanced capabilities of the apparatus at a target base station. The one or more enhanced capabilities of the apparatus include at least one of a capability of the apparatus to perform handover with low latency relative to devices that lack the one or more enhanced capabilities, or a capability of the apparatus to support enhanced component carrier operation.

Certain aspects of the present disclosure provide a user equipment (UE). The UE generally includes a processor and a memory coupled to the at least one processor. The at least one processor is configured to signal one or more enhanced capabilities of the UE to at least one source base station, and perform one or more handover-related procedures based, at least in part, on the one or more enhanced capabilities of the UE and support for the one or more enhanced capabilities of the UE at a target base station. The one or more enhanced capabilities of the UE include at least one of a capability of the UE to perform handover with low latency relative to devices that lack the one or more enhanced capabilities, or a capability of the UE to support enhanced component carrier operation.

Certain aspects of the present disclosure provide a computer-readable medium for wireless communication having instructions stored thereon. The instructions are executable by one or more processors, for signaling, by a user equipment (UE), one or more enhanced capabilities of the UE to at least one source base station, and performing, by the UE, one or more handover-related procedures based, at least in part, on the one or more enhanced capabilities of the UE and support for the one or more enhanced capabilities of the UE at a target base station. The one or more enhanced capabilities of the UE include at least one of a capability of the UE to perform handover with low latency relative to devices that lack the one or more enhanced capabilities, or a capability of the UE to support enhanced component carrier operation.

Certain aspects of the present disclosure provide a method of wireless communication by a source base station. The method generally includes receiving an indication of one or more enhanced capabilities of a user equipment (UE), and performing one or more handover-related procedures to handover the UE from the source base station to a target base station based, at least in part, on the one or more enhanced capabilities of the UE and support for the one or more enhanced capabilities of the UE at the target base station. The one or more enhanced capabilities of the UE include at least one of a capability of the UE to perform the handover with low latency relative to devices that lack the one or more enhanced capabilities, or a capability of the UE to support enhanced component carrier operation.

Certain aspects of the present disclosure provide an apparatus for wireless communications. The apparatus generally includes means for receiving an indication of one or more enhanced capabilities of a user equipment (UE), and performing one or more handover-related procedures to handover the UE from the apparatus to a target base station based, at least in part, on the one or more enhanced capabilities of the apparatus and support for the one or more enhanced capabilities of the apparatus at the target base station. The one or more enhanced capabilities of the apparatus include at least one of a capability of the apparatus to perform the handover with low latency relative to devices that lack the one or more enhanced capabilities, or a capability of the apparatus to support enhanced component carrier operation.

Certain aspects of the present disclosure provide a source base station. The source base station generally includes at least one processor and a memory coupled to the at least one processor. The at least one processor is configured to receive an indication of one or more enhanced capabilities of a user equipment (UE), and perform one or more handover-related procedures to handover the UE from the source base station to a target base station based, at least in part, on the one or more enhanced capabilities of the UE and support for the one or more enhanced capabilities of the UE at the target base station. The one or more enhanced capabilities of the UE include at least one of a capability of the UE to perform the handover with low latency relative to devices that lack the one or more enhanced capabilities, or a capability of the UE to support enhanced component carrier operation.

Certain aspects of the present disclosure provide a computer-readable medium for wireless communication having instructions stored thereon. The instructions are executable by one or more processors, for receiving, by a source base station, an indication of one or more enhanced capabilities of a user equipment (UE), and performing, by the source base station, one or more handover-related procedures to handover the UE from the source base station to a target base station based, at least in part, on the one or more enhanced capabilities of the UE and support for the one or more enhanced capabilities of the UE at the target base station. The one or more enhanced capabilities of the UE include at least one of a capability of the UE to perform the handover with low latency relative to devices that lack the one or more enhanced capabilities, or a capability of the UE to support enhanced component carrier operation.

Certain aspects of the present disclosure provide a method of wireless communication by a target base station. The method generally includes receiving an indication of one or more enhanced capabilities of a user equipment (UE), and performing one or more handover-related procedures to handover the UE from a source base station to the target base station based, at least in part, on the one or more enhanced capabilities of the UE and support for the one or more enhanced capabilities of the UE at the target base station. The one or more enhanced capabilities of the UE include at least one of a capability of the UE to perform the handover with low latency relative to devices that lack the one or more enhanced capabilities, or a capability of the UE to support enhanced component carrier operation.

Certain aspects of the present disclosure provide an apparatus for wireless communication. The apparatus generally includes means for receiving an indication of one or more enhanced capabilities of a user equipment (UE), and performing one or more handover-related procedures to handover the UE from a source base station to the apparatus based, at least in part, on the one or more enhanced capabilities of the UE and support for the one or more enhanced capabilities of the UE at the apparatus. The one or more enhanced capabilities of the UE include at least one of a capability of the UE to perform the handover with low latency relative to devices that lack the one or more enhanced capabilities, or a capability of the UE enhanced component carrier capability.

Certain aspects of the present disclosure provide a target base station. The target base station generally includes at least one processor and a memory coupled to the at least one processor. The at least one processor is configured to receive an indication of one or more enhanced capabilities of a user equipment (UE), and perform one or more handover-related procedures to handover the UE from a source base station to the target base station based, at least in part, on the one or more enhanced capabilities of the UE and support for the one or more enhanced capabilities of the UE at the target base station. The one or more enhanced capabilities of the UE include at least one of a capability to perform the handover with low latency relative to devices that lack the one or more enhanced capabilities, or a capability of the UE to support enhanced component carrier operation.

Certain aspects of the present disclosure provide a computer-readable medium for wireless communication having instructions stored thereon. The instructions are executable by one or more processors, for receiving, by a target base station, an indication of one or more enhanced capabilities of a user equipment (UE), and performing, by the target base station, one or more handover-related procedures to handover the UE from a source base station to the target base station based, at least in part, on the one or more enhanced capabilities of the UE and support for the one or more enhanced capabilities of the UE at the target base station. The one or more enhanced capabilities of the UE include at least one of a capability of the UE to perform the handover with low latency relative to devices that lack the one or more enhanced capabilities, or a capability of the UE to support enhanced component carrier operation.

Numerous other aspects are provided including apparatus, systems and computer program products. Various aspects and features of the disclosure are described in further detail below.

DETAILED DESCRIPTION

Aspects of the present disclosure provide techniques for discovering whether one or more enhanced capabilities are supported by devices (e.g., user equipment (UE), base station (BS), etc.) in a network. The enhanced capabilities may include, for example, the ability to support certain low latency procedures or enhanced component carrier (eCC) capability. The present disclosure provides techniques for performing one or more handover-related procedures (e.g., cell selection/reselection, make-before-break handover, etc.) and/or other procedures (e.g., QoS negotiation) based, at least in part, on support for the one or more enhanced capabilities.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
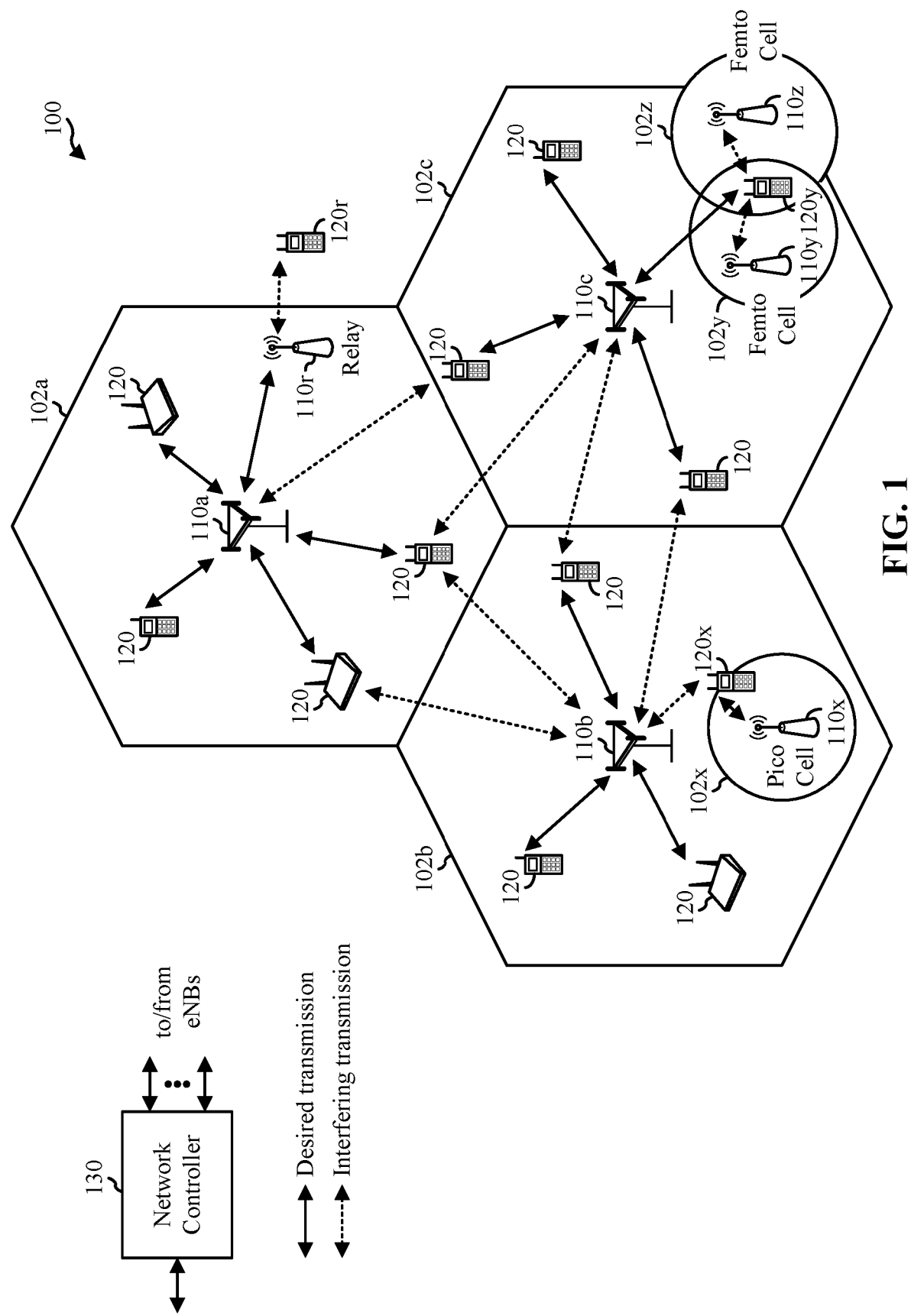
FIG. 1 is a block diagram conceptually illustrating an example of a wireless communications network in accordance with certain aspects of the present disclosure.

FIG. 1 shows a wireless communication network 100 (e.g., an LTE network), in which the techniques described herein may be practiced. For example, the techniques may be utilized when performing one or more procedures related to handover of UEs 120 between eNBs 110.

As illustrated, the wireless network 100 may include a number of evolved Node Bs (eNBs) 110 and other network entities. An eNB may be a station that communicates with user equipment devices (UEs) and may also be referred to as a base station (BS), a Node B, an access point (AP), etc. Each eNB 110 may provide communication coverage for a particular geographic area. The term "cell" may refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

A UE may be within the coverage of multiple eNBs. One of these eNBs may be selected to serve the UE. The serving eNB may be selected, for example, based on various criteria such as received power, received quality, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (e.g., and not based on the transmit power level of the eNB).

According to certain aspects provided herein, one or more UEs (e.g., UE 120, UE 120y, UE 120x, etc. illustrated in FIG. 1) and one or more eNBs (e.g., eNB 110a, eNB 110b, eNB 110c, etc. illustrated in FIG. 1) may support one or more enhanced capabilities (e.g., low latency procedures, eCC, etc.) in the wireless communication network 100. However, before the UE(s) and/or eNB(s) in the network 100 can use one or more of the enhanced procedures, the UE(s) and/or eNB(s) may first have to determine (discover) whether other nodes (e.g., UEs, eNB(s), etc.) in the network 100 can support one or more of the enhanced capabilities. Put differently, the UE(s) in the network 100 may not know whether the eNB(s) in the network 100 support one or more of the enhanced capabilities, and vice versa. Aspects presented herein provide techniques to allow the UE(s) and/or eNB(s) in the network 100 to discover each other's capability to support one or more enhanced procedures, such as for cell selection/reselection, QoS negotiation, handover, etc. The UE(s) and/or eNB(s) in the network 100 may then participate in one or more of the enhanced procedures, based on the discovered capabilities of the eNB(s) and/or UE(s) in the network. According to certain aspects, as will be described in more detail below, the UEs may indicate their support for one or more of the enhanced capabilities to one or more eNBs in the wireless network 100. Similarly, the eNBs may indicate whether one or more enhanced capabilities are supported to one or more UEs in the wireless network 100. As will further be described in more detail below, the UEs and/or eNBs may then perform one or more handover-related procedures based on whether the UEs and/or eNBs support the one or more enhanced capabilities.

Figure 2:
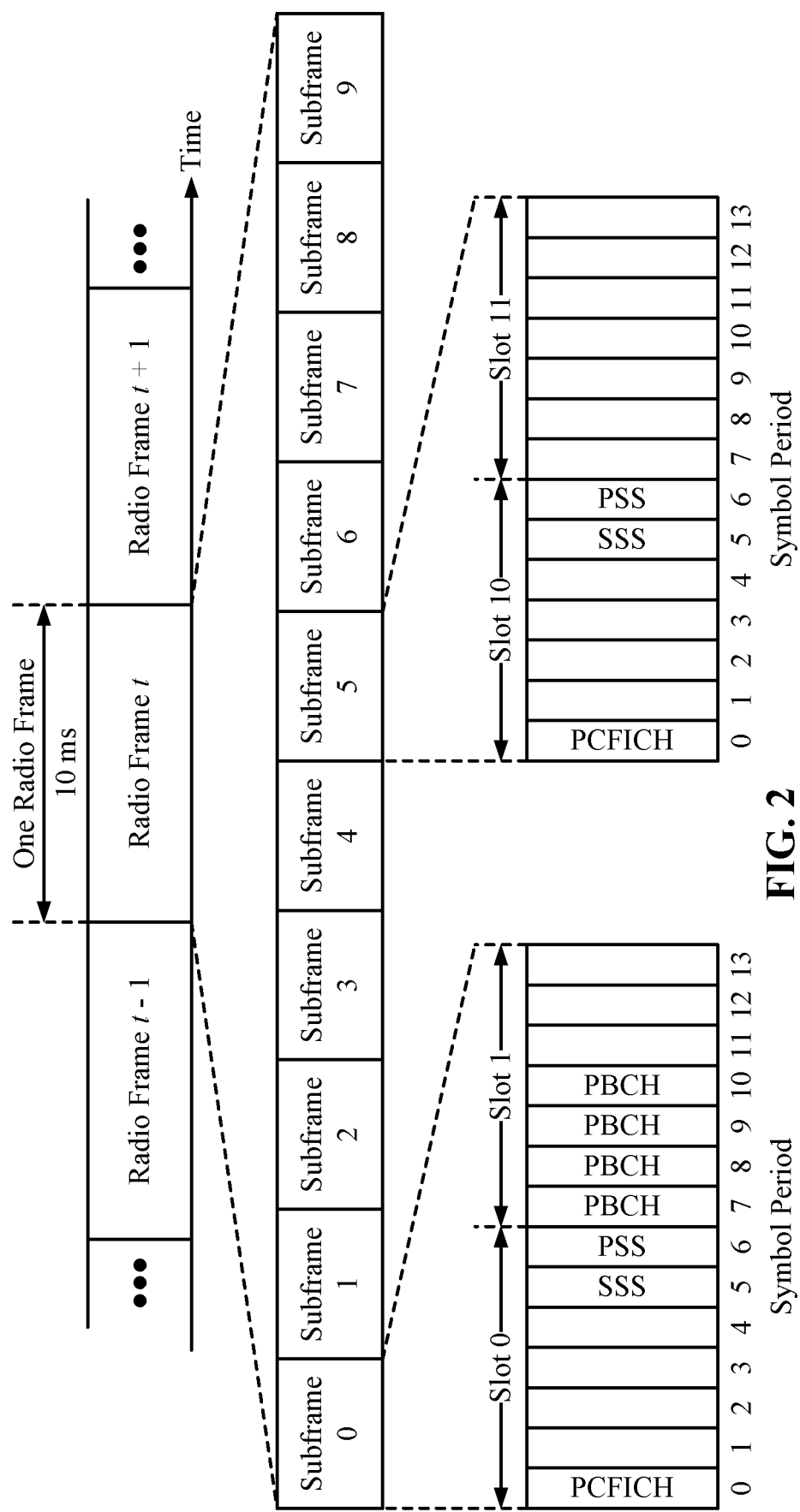
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PD- CCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
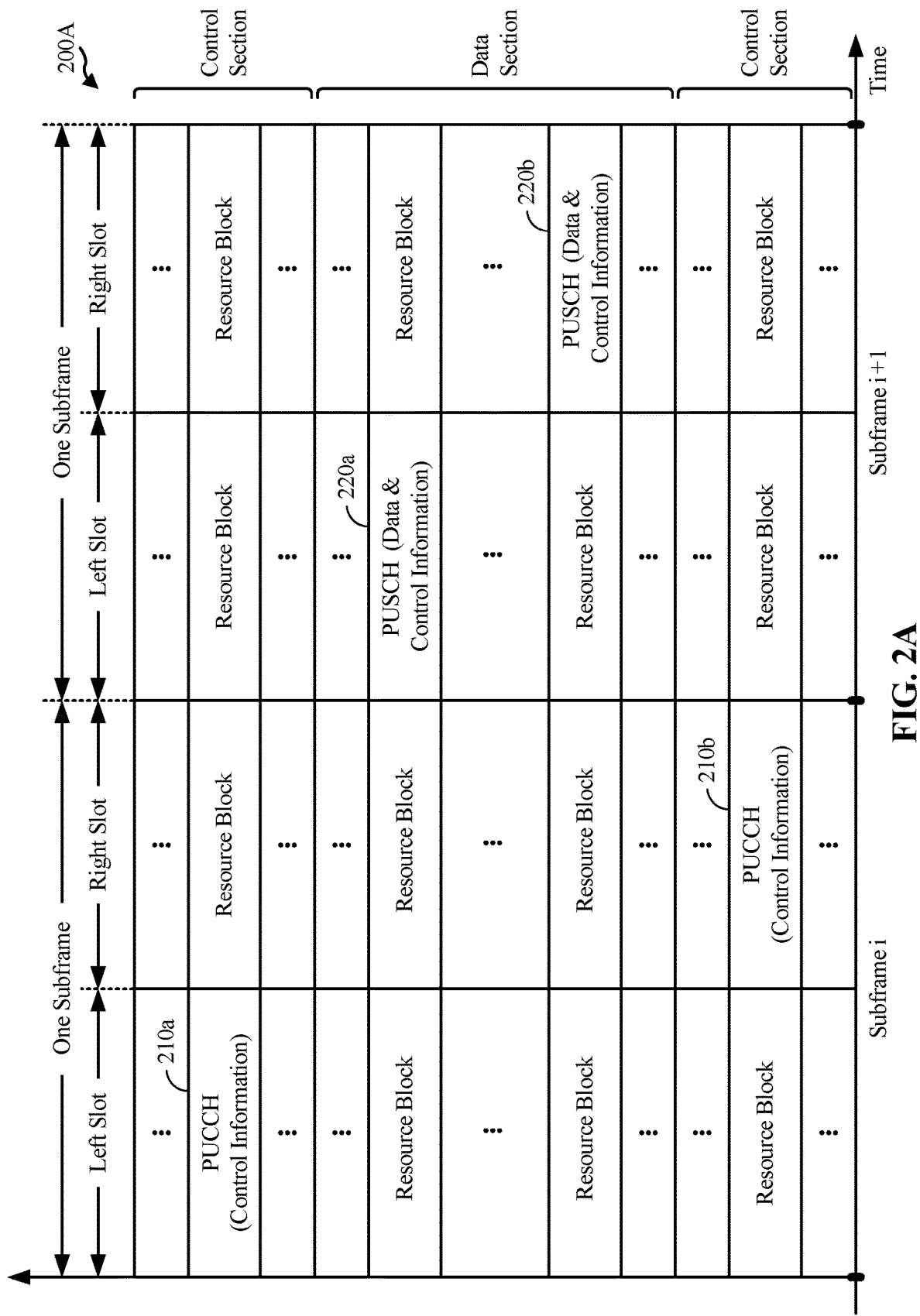
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

Figure 3:
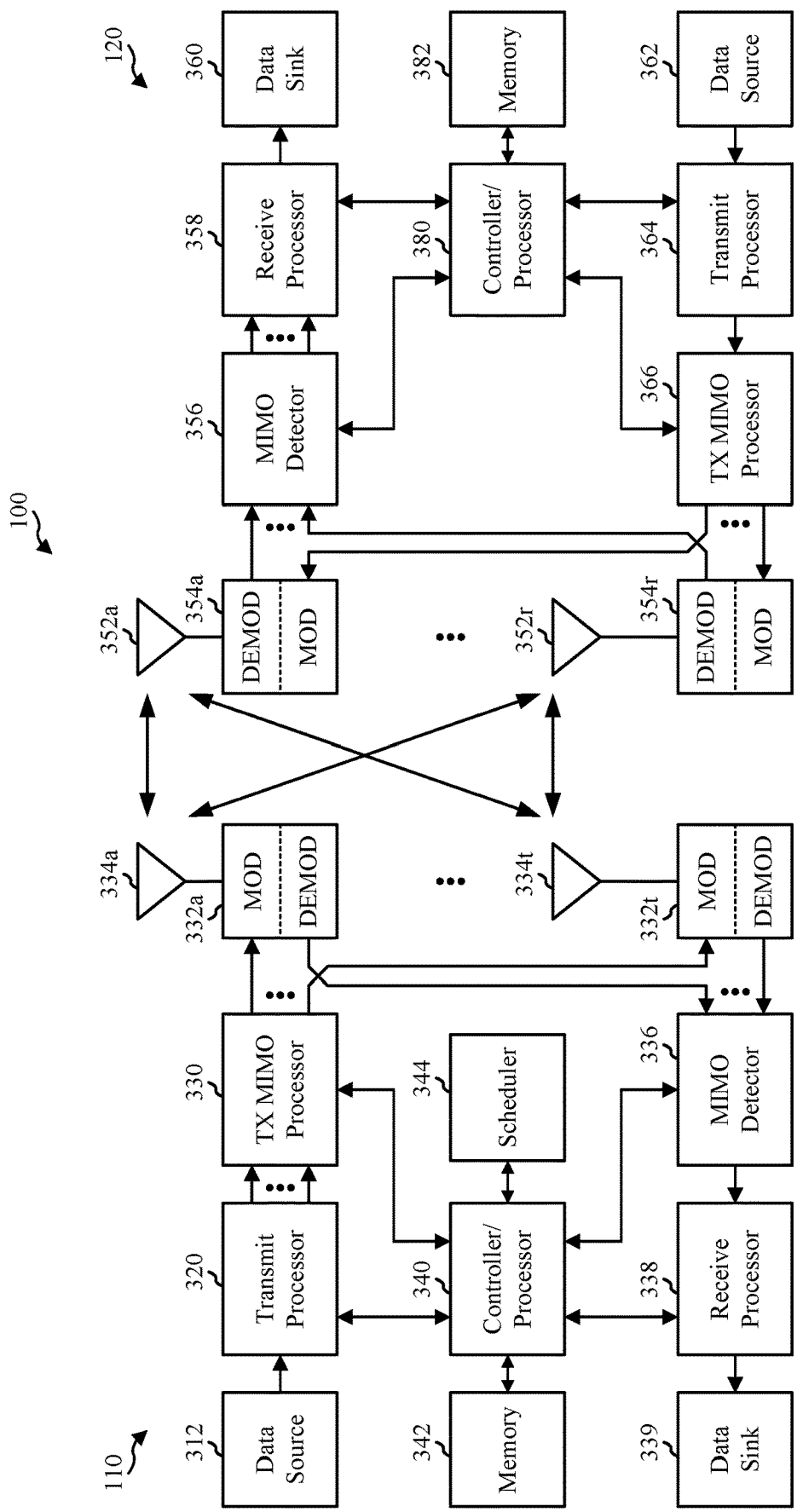
FIG. 3 shows a block diagram conceptually illustrating an example of a enhanced Node B (eNB) in communication with a user equipment device (UE) in a wireless communications network in accordance with certain aspects of the present disclosure.

FIG. 3 illustrates a block diagram of a design of a BS/eNB 110 and a UE 120 in the wireless communication network 100. In certain aspects, the BS/eNB 110 may be one of the BSs/eNBs illustrated in FIG. 1 and the UE 120 may be one of the UEs illustrated in FIG. 1. Both the BS/eNB 110 and UE 120 may perform handover-related procedures based on their awareness of the others' enhanced capabilities. Thus, the BS/eNB 110 may be configured to perform BS-side (e.g., source BS and/or target BS) operations described below with reference to FIGS. 6 and 7, while UE 120 may be configured to perform UE-side operations described below with reference to FIG. 5.

For a restricted association scenario, the eNB 110 may be macro eNB 110c in FIG. 1, and UE 120 may be UE 120y in FIG. 1. The eNB 110 may also be a BS of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. For example, the controller/processor 380 and/or other processors and modules at the UE 120 may perform or direction operations described below with reference to FIG. 5 and/or other processes for the techniques described herein. According to another aspect, the controller/processor 340 and/or other processors and modules at the BS/eNB 110 may perform or direct operations described below with reference to FIGS. 6, 7 and/or other processes for the techniques described herein. The memories 342 and 382 may store data and program codes for the eNB 110 and UE 120, respectively. A scheduler 344 may schedule UEs for data transmission on the downlink and/or uplink.

Example Handover

As noted above, current procedures for handover of a UE from a source (serving) BS to a target BS involve a relatively large latency between the time a UE initiates and actually gains access.

Figure 4:
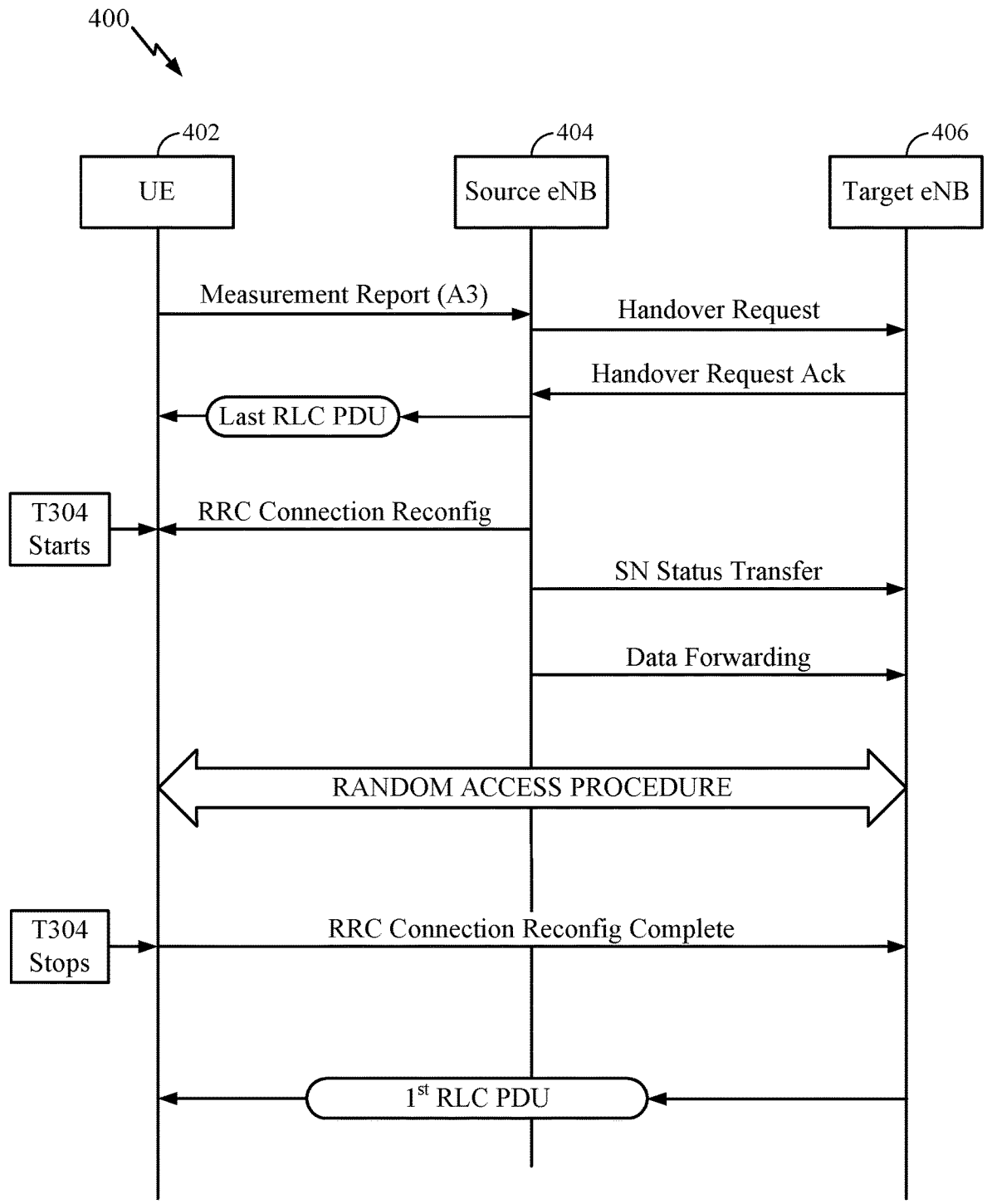
FIG. 4 illustrates an example call flow for handover of a user equipment (UE) from a source base station (BS) to a target BS.

For example, FIG. 4 illustrates an example call flow 400 for a current procedure that may be performed to handover a UE 402 (e.g., one of the UEs illustrated in FIGS. 1 and 3) from a source eNB 404 to a target eNB 406 in the wireless communication network 100. According to certain aspects, the source eNB 404 and the target eNB 406 may be one of the BSs/eNBs illustrated in FIGS. 1 and 3. For example, in one scenario, the source eNB 404 may be BS/eNB 110a illustrated in FIG. 1 and the target eNB 406 may be eNB 110b or eNB 110c illustrated in FIG. 1.

According to certain aspects, as described above with reference to FIG. 1, a UE (e.g., UE 120) may be within the coverage of multiple eNBs (e.g., eNB 110a, 110b, 110c, etc.) in the wireless communication network 100. The UE may be served by a source eNB (e.g., eNB 110a in FIG. 1) that is selected, for example, based on various criteria such as received power, received quality, path loss, SNR, etc. As illustrated in FIG. 4, the various criteria may be included within a measurement report (A3) that is sent by the UE 402 to the source eNB 404.

Based on the measurement report sent from the UE 402, the source eNB 404 may transmit a handover request to the target eNB 406. The handover request may be triggered by the relative value(s) of one or more criteria (e.g., received power, received quality, path loss, etc.) included within the measurement report. For example, in one scenario, the measurement report may indicate a lower received power for the source eNB 404 than the received power for the target eNB 406. However, it should be noted that, in general, the handover request may be triggered by other criteria included within the measurement report. The handover request may contain information (e.g., signaling contexts, cell radio network temporary identifier (C-RNTI) for the UE 402 in the source eNB 404, target cell physical cell identifier (PCI), source cell PCI, etc.) that is used to prepare the handover at the target eNB 406.

After receiving the handover request, the target eNB 406 may send a handover request acknowledgement (ACK) to the source eNB 404. The handover request ACK may contain information, such as a new C-RNTI for the target eNB 406, access parameters, etc., that may be sent to the UE 402 as part of the handover command (e.g., radio resource control (RRC) connection reconfiguration message) sent by the source eNB 404. Once the source eNB 404 receives the handover request ACK, the source eNB 404 may send its last radio link control (RLC) protocol data unit (PDU) to the UE 402. The source eNB 404 may then generate a RRC connection reconfiguration message (e.g., handover command) and transmit the message to the UE 402 (as an indication to the UE of the pending handover).

As shown, the receipt of the RRC connection reconfiguration message may trigger the start of a timer (e.g., timer T304 illustrated in FIG. 4). The T304 timer may be used to guard the handover process and/or cell change order. For example, if the UE 402 successfully hands over to the target eNB 406 (e.g., as indicated by the transmission of a RRC reconfiguration complete message illustrated in FIG. 4), the T304 may stop. However, if the T304 timer expires before the UE 402 has successfully performed a random access procedure and sent the RRC reconfiguration complete message, the UE 402 may perform a RRC reestablishment procedure.

After receiving the handover request ACK, the source eNB 404 may also transmit the sequence number (SN) status transfer message to the target eNB 406 to convey the uplink packet data convergence protocol (PDCP) SN receiver status and the downlink PDCP SN transmitter status of evolved packet system (EPS) bearers. The source eNB 404 may also forward any remaining data in the buffer(s) to the target eNB 406.

After receiving the RRC connection reconfiguration message, the UE 402 may perform a random access procedure with the target eNB 406 via a random access channel (RACH). In certain aspects, the random access procedure may be contention based (e.g., if no dedicated preamble was allocated for the UE). Following the contention based procedure (e.g., after receiving timing advance information and uplink allocation from the target eNB), the UE 402 may send an RRC connection reconfiguration complete (e.g., handover confirm) message to the target eNB 406 to indicate successful RRC reconfiguration and that the UE 402 is ready to receive data from the target eNB 406. After receiving the handover confirm message, the target eNB 406 may then send its first RLC PDU to the UE 402.

As illustrated in FIG. 4, the overall handover process may start with the last measurement report sent from the UE 402 to the source eNB 404 and end when the UE 402 sends a RRC connection reconfiguration complete message to the target eNB 406.

As illustrated, the UE 402 may experience a data interruption from the handover process (e.g., measured by the amount of time the UE 402 is not receiving RLC PDUs) in FIG. 4. For example, the UE 402 may experience an interruption time from the last RLC PDU received from the source eNB 404 to the first RLC PDU sent from the target eNB 406. The data interruption from the handover process may be significant, for example, with a duration of 80 ms or longer. Further, in some cases, other procedures (e.g., such as Quality of Service (QoS) negotiation, etc.) may not start until after the RRC connection is reestablished (e.g., after transmission of the handover confirm message), which may further interrupt the service experienced by the UE 402. Accordingly, techniques for reducing the handover data interruption time and QoS negotiation time may be desirable.

Services and/or Handover Based on Low Latency/eCC Discovery

As noted above, according to certain aspects presented herein, one or more devices (e.g., UE, source BS, target BS, relay, etc.) in the wireless communication network (e.g., as illustrated in FIGS. 1 and 3) may support one or more enhanced capabilities.

For example, in one aspect, a UE or eNB may support a low latency (or ultra low latency "ULL") capability. As used herein, the term ultra low latency capability generally refers to the capability to perform certain procedures with low latency relative to devices that lack the capability (e.g., so called "legacy" devices). In one implementation, the ULL capability may refer to the ability to support transmission time interval (TTI) periods around 0.1 ms or less (e.g., 20 us), for example, relative to a conventional 1 ms LTE subframe duration. However, it should be noted that, in other implementations, the ULL capability may refer to other low latency periods.

According to certain aspects, an enhanced component carrier (eCC) capability may be supported. As used herein, the term eCC capability generally refers to the capability to aggregate multiple carriers with each carrier having bandwidth greater than 20 MHz in order to increase overall system bandwidth, which may lead to support of higher bitrates. In certain aspects, eCC capability may allow one carrier to have wider bandwidth greater than 20 MHz (e.g., each carrier can have a bandwidth of 80 MHz) in both uplink and downlink directions, across multiple bands, and across licensed and unlicensed spectrum. In eCC, contiguous CC aggregation and non-contiguous CC aggregation may be supported as well as aggregation in both time and/or frequency domains (e.g., time division duplexing (TDD) or frequency division duplexing (FDD) in LTE).

In general, however, the one or more enhanced capabilities may refer to other capabilities such as, advanced antenna configurations, coordinated multipoint (CoMP) transmission and reception, advanced interference management techniques, better quality of service, and the like.

According to techniques provided herein, one or more devices in the wireless communication network may indicate their support for one or more enhanced capabilities to one or more other devices in the wireless network and vice versa. Based on the indicated support for the one or more enhanced capabilities, the one or more devices in the wireless network may then perform one or more handover-related procedures (such as cell selection/reselection, make-before-break handover, etc.) and/or other procedures (e.g., QoS negotiation), based, at least in part, on the supported enhanced capabilities. In other words, these devices may perform handover-related procedures and/or other procedures differently when interacting with devices that support enhanced capabilities than when interacting with devices that do not support enhanced capabilities.

A base station may learn of the UE enhanced capabilities, for example, via a UE capabilities IE obtained during RRC connection establishment. A UE may learn that one or more cells support enhanced capabilities, for example, during discovery (e.g., by detecting broadcast system information or obtaining information regarding neighbor cells from a serving base station).

Figure 5:
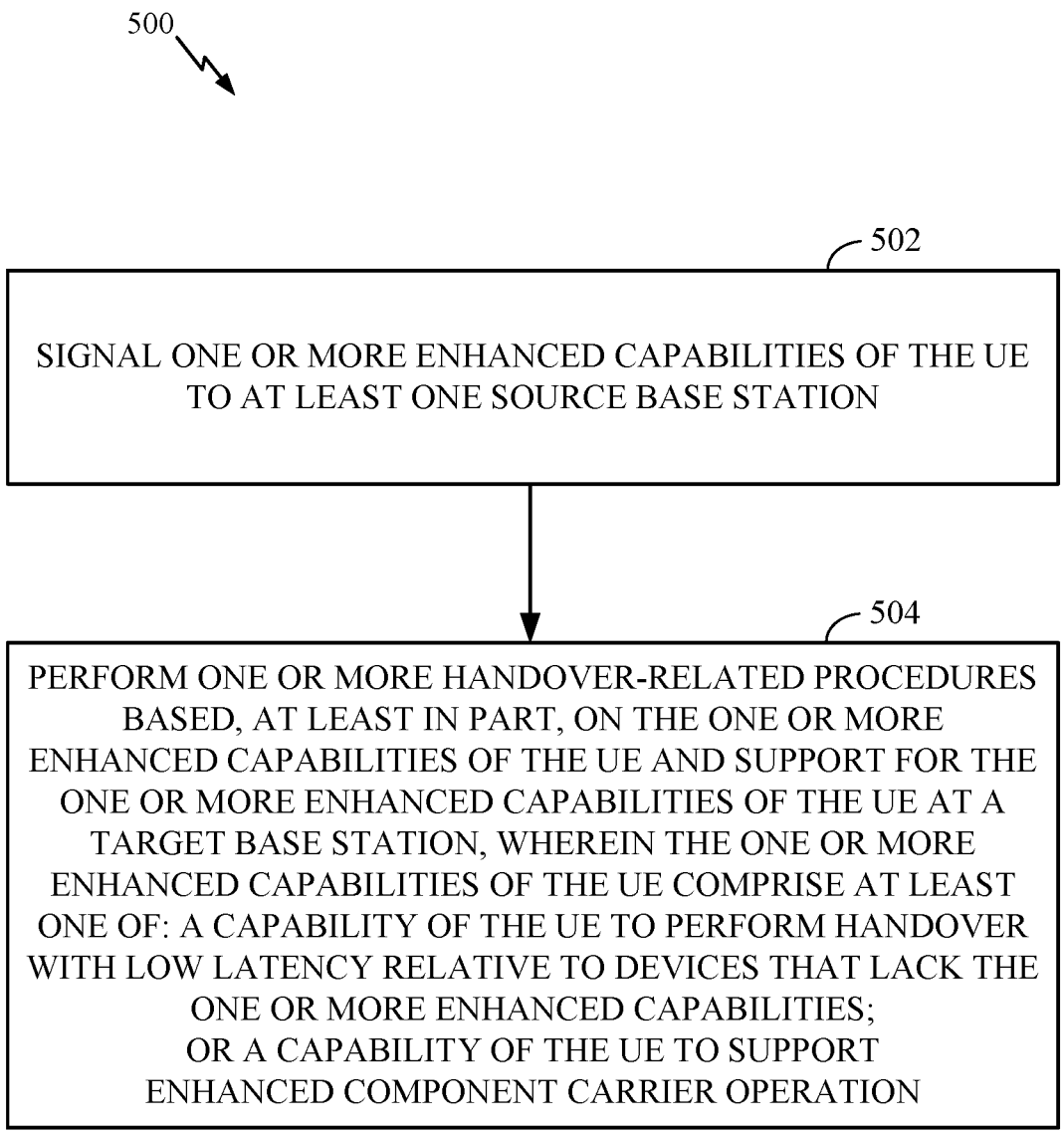
FIG. 5 illustrates example operations that may be performed by a user equipment (UE) to perform one or more handover-related procedures in accordance with certain aspects of the present disclosure.
Figure 6:
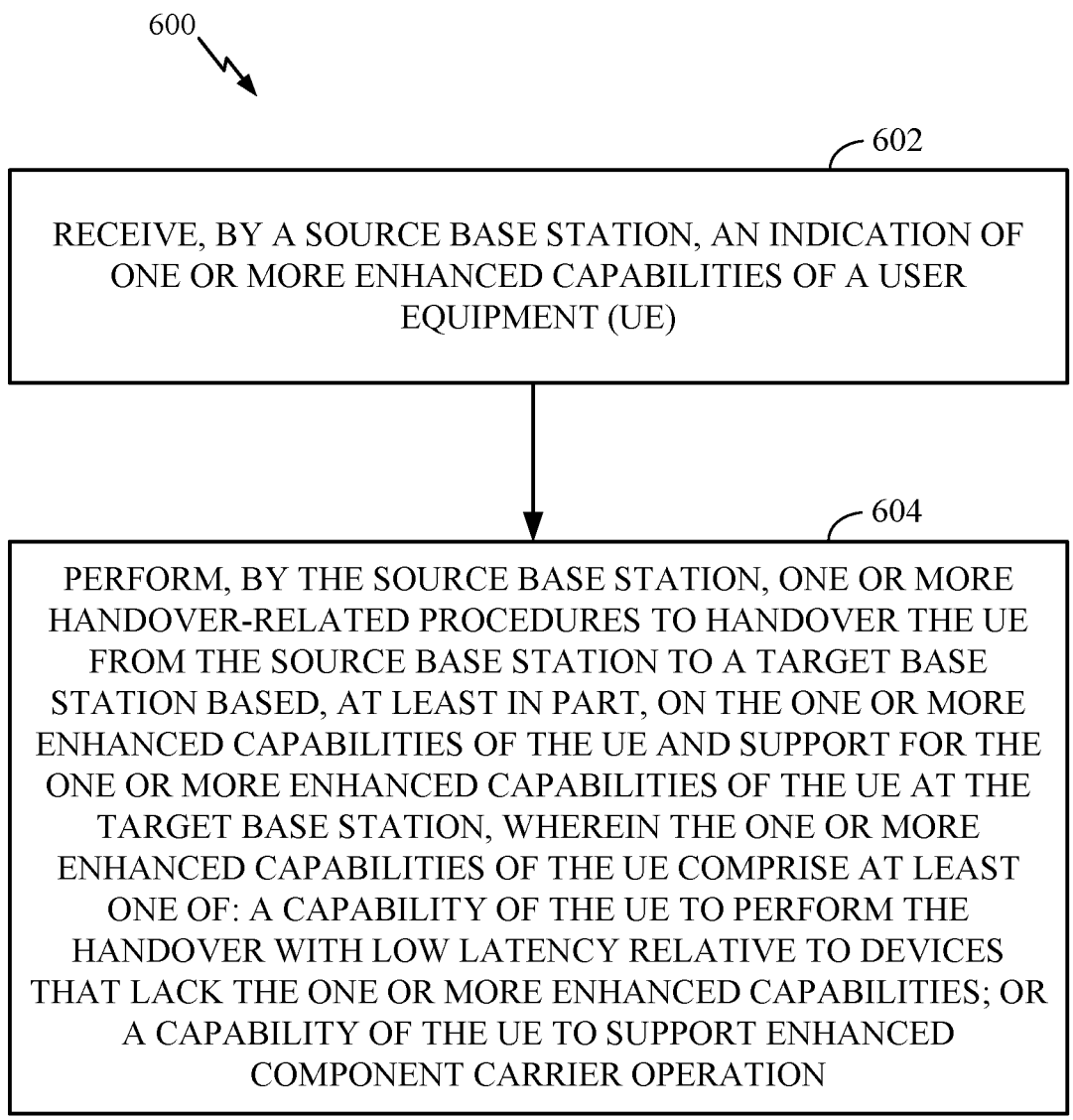
FIG. 6 illustrates example operations that may be performed by a source base station (BS) to perform one or more handover-related procedures in accordance with certain aspects of the present disclosure.
Figure 7:
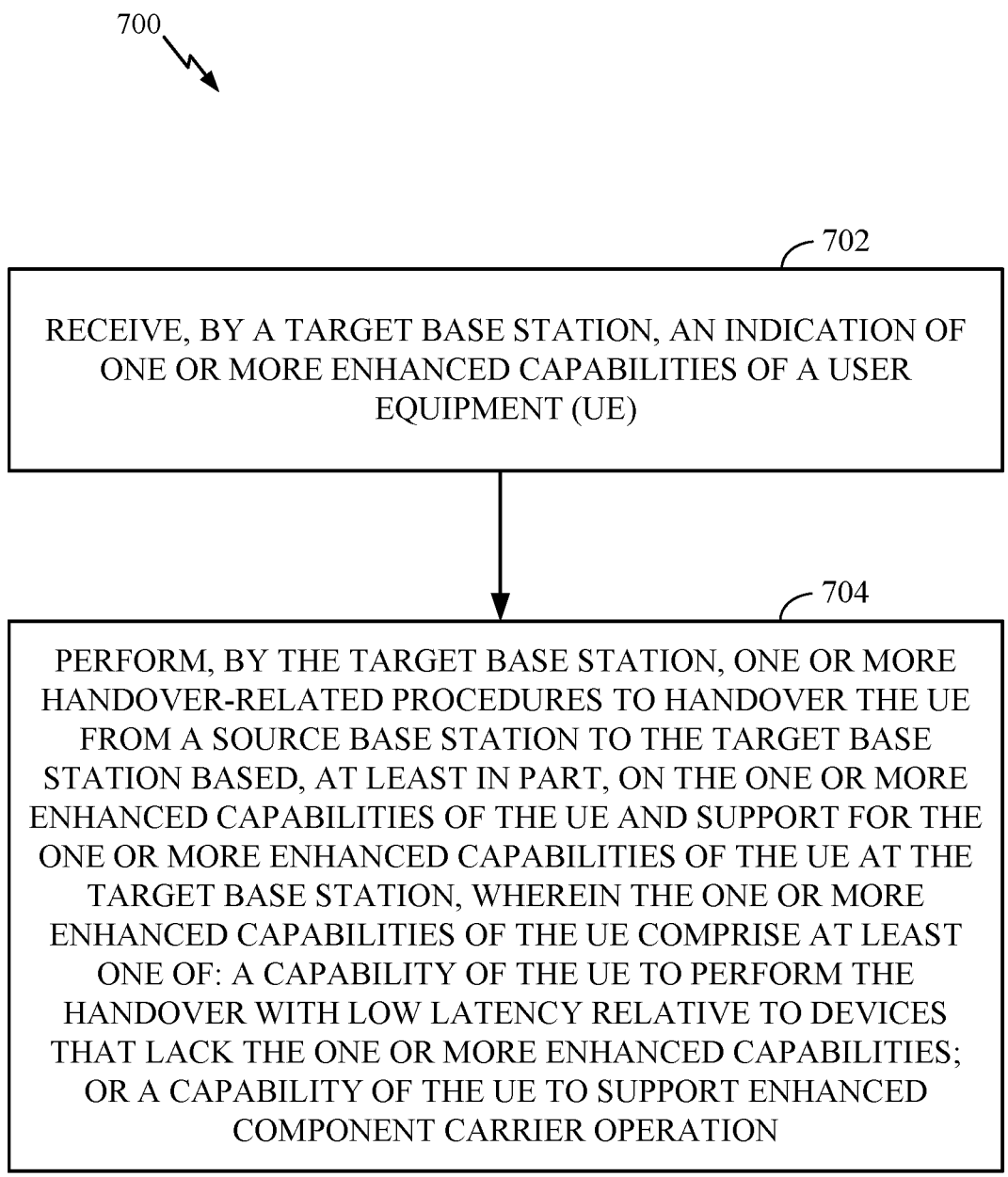
FIG. 7 illustrates example operations that may be performed by a target base station (BS) to perform one or more handover-related procedures in accordance with certain aspects of the present disclosure.

FIGS. 5, 6 and 7 illustrate example operations that may be performed by different devices (e.g., a UE, source BS, and target BS, respectively) in the wireless communication network for one or more handover-related procedures. The operations may be performed, for example, as part of an enhanced handover procedure as shown in the call flow diagram of FIG. 8.

Figure 8:
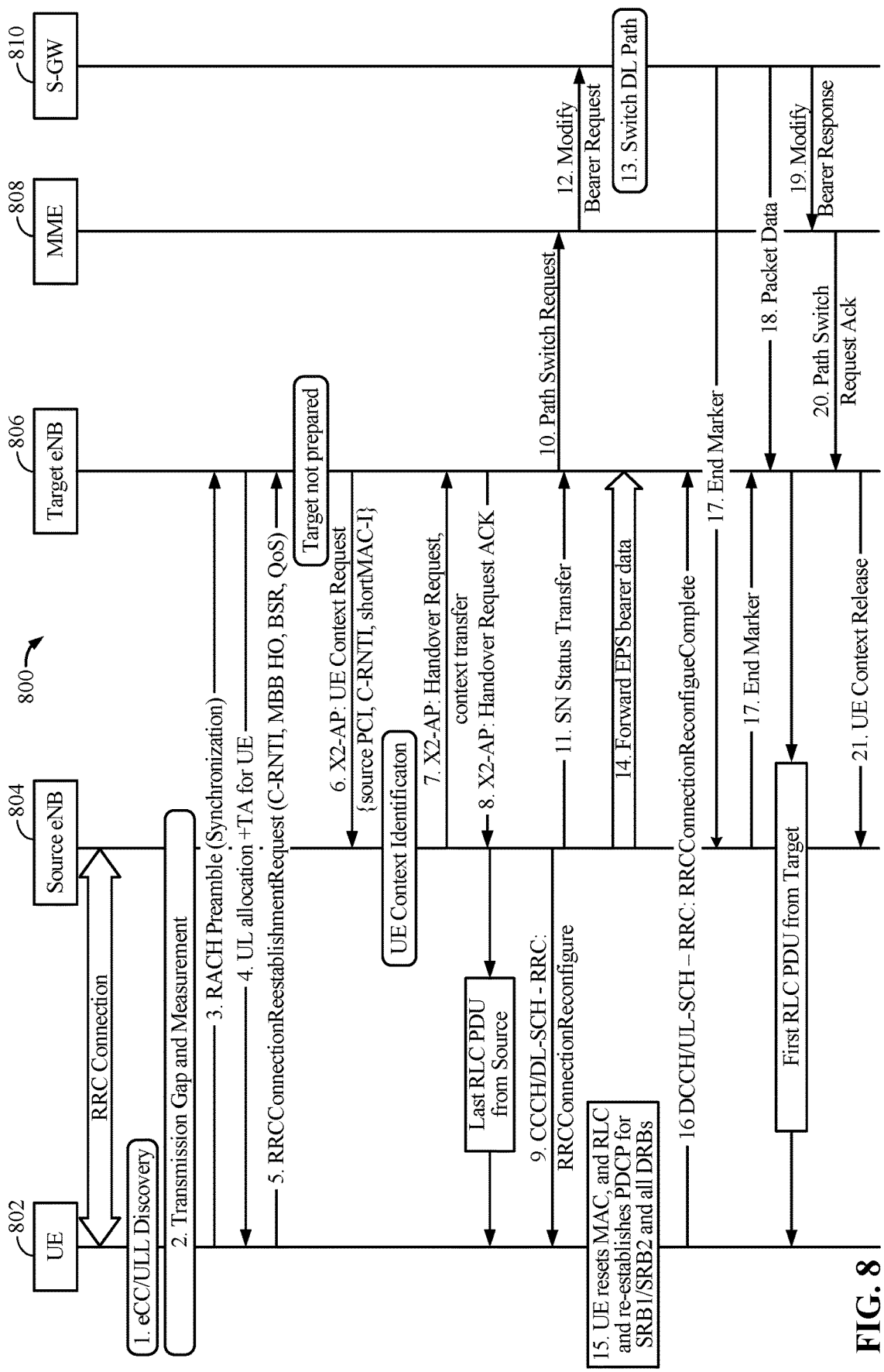
FIGS. 8-10 illustrate example enhanced call flows for handover of a UE with enhanced capability from a source base station (BS) to a target BS, in accordance with certain aspects of the present disclosure.

For example, FIG. 5 illustrates example operations 500 for one or more handover-related procedures that may be performed, for example, by a UE (e.g., UE 120 in FIGS. 1 and 3, UE in FIG. 4, UE in FIG. 8, etc.).

At 502, the UE signals one or more enhanced capabilities of the UE to at least one BS. For example, as noted above, the indication may occur as part of a capabilities exchange between the UE and the network and may signal support for enhanced features. Alternatively, support for enhanced capabilities may signaled by a UE identifier which may, for instance, be linked with information in a subscriber profile. At 504, the UE performs one or more handover-related procedures based, at least in part, on the one or more enhanced capabilities of the UE and support for the one or more enhanced capabilities of the UE at a target BS. The one or more enhanced capabilities of the UE may include at least one of a capability of the UE to perform certain procedures (e.g., handover) with low latency relative to devices that lack the one or more enhanced capabilities, or a capability of the UE to support eCC operation.

FIG. 6 illustrates example operations 600 for one or more handover-related procedures that may be performed, for example, by a source BS (e.g., BS/eNB 110 in FIGS. 1 and 3, source eNB in FIG. 4, source eNB in FIG. 8, etc.).

At 602, the source BS receives an indication of one or more enhanced capabilities of a UE. For example, the indication of the one or more enhanced capabilities may be signaled by the UE during the capabilities exchange, via the MME in subscriber profile, etc. At 604, the source BS performs one or more handover-related procedures to handover the UE from the source BS to a target BS based, at least in part, on the one or more enhanced capabilities of the UE and support for the one or more enhanced capabilities of the UE at the target BS. The one or more enhanced capabilities of the UE may include at least one of a capability of the UE to perform certain procedures (e.g., handover) with low latency relative to devices that lack the one or more enhanced capabilities, or a capability of the UE to support eCC operation.

FIG. 7 illustrates example operations 700 for one or more handover-related procedures that may be performed, for example, by a target BS (e.g., BS/eNB 110 in FIGS. 1 and 3, target eNB in FIG. 4, target eNB in FIG. 8, etc.).

At 702, the target BS receives an indication of one or more enhanced capabilities of a UE (e.g., obtained by a source/serving BS during the capabilities exchange, via the MME in subscriber profile, etc.). At 704, the target BS performs one or more handover-related procedures to handover the UE from a source BS to the target BS based, at least in part, on the one or more enhanced capabilities of the UE and support for the one or more enhanced capabilities of the UE at the target BS. The one or more enhanced capabilities of the UE may include at least one of a capability of the UE to perform certain procedures (e.g., handover) with low latency relative to devices that lack the one or more enhanced capabilities, or a capability of the UE to support eCC operation.

As mentioned above, according to certain aspects, it may be desirable to reduce the amount of time the UE is interrupted from receiving/transmitting data due to the handover process (e.g., relative to the handover process illustrated in FIG. 4). The enhanced capabilities described herein may allow for enhanced procedures (e.g., handover and/or QoS negotiation) that reduce the amount of time the UE is interrupted from receiving data from a serving/source eNB to when the UE is able to receive data from a target eNB.

FIG. 8 illustrates an example enhanced call flow 800 for performing one or more handover-related procedures in one or more devices (e.g., UE, source eNB, target eNB, etc.) in accordance with aspects of the present disclosure. According to certain aspects, the UE 802 illustrated in FIG. 8 may be any one of the UEs in FIGS. 1, 3, 4, etc. and the source BS 804/target BS 806 illustrated in FIG. 8 may be any one of the BSs/eNBs illustrated in FIGS. 1, 3, 4, etc.

As mentioned above, the enhanced call flow may allow for various improvements relative to the handover call flow (shown in FIG. 4) that may significantly reduce the data interruption time associated with the handover. For example, these improvements may include (but are not limited to) allowing devices to perform contention-free RACH (e.g., with dedicated preambles reserved for one or more enhanced capabilities) and exchange context transfer and other messages related to the handover quicker, while performing a make-before-break handover with continued PDUs delivered from the source eNB 804 until the UE 802 is ready to receive data from the target eNB 806.

As mentioned above with respect to FIG. 5, the UE may indicate its support for one or more enhanced capabilities to at least one BS/eNB. For example, as shown in FIG. 8, the UE 802 may establish an RRC connection with a source eNB 804 and indicate its support for one or more enhanced capabilities to the source eNB 804 via the RRC connection procedure. As described above, the indication may occur as part of a capabilities exchange between the UE 802 and the network and may signal support for enhanced features. Support for enhanced capabilities may also be signaled by a UE identifier which may, for example, be linked with information in a subscriber profile. In one aspect, the UE 802 may indicate its capability to support ULL (e.g., capability to perform certain procedures with low latency relative to devices that lack the capability), eCC, make-before-break handover, and/or any other enhanced capability described above. Similarly, the UE 802 may also indicate its support for one or more enhanced capabilities to the target eNB 806 via a RRC connection procedure at step 3 (e.g., during a capabilities exchange, UE identifier in a subscriber profile, etc.).

In addition, as shown in step 1 of FIG. 8, the UE 802 may discover whether one or more enhanced capabilities are supported by one or more BSs/eNBs in the wireless network. For example, during step 1, the UE 802 may receive an indication of one or more enhanced capabilities of the target eNB 806. In one example, the indication may be received as part of the capabilities exchange described above. In one aspect, the UE 802 may receive the indication of the one or more enhanced capabilities of the target eNB 806 via broadcast signaling. For example, the target eNB 806 may broadcast signal information blocks (SIBs) that indicate its support for one or more enhanced capabilities. As another example, the source eNB 804 may provide (e.g., via SIBs) the one or more enhanced capabilities supported by the target eNB 806 to the UE 802 (e.g., the source and target eNBs may exchange such information via a backhaul connection). In general, however, the UE 802 may receive the indication(s) of one or more enhanced capabilities of the target eNB(s) via any type of signaling (e.g., unicast, broadcast, multicast, etc.). When the source/target eNB indicates its capability, it may take into consideration various factors, such as its load and congestion status and whether it can admit the new users. The UE 802 may trigger the discovery procedures when the serving cell signal strength (e.g., RSRP, RSRQ) is below a certain threshold, which can be configured by the UE 802 or indicated by the source/target eNB.

As mentioned above with respect to FIG. 5, the UE may perform one or more handover-related procedures (which may include QoS negotiations) based, at least in part, on the one or more enhanced capabilities of the UE and one or more enhanced capabilities of a target eNB. As noted above, these procedures may be performed in a manner that allows for a reduction in the amount of time data delivered between the UE and network (via the source/target eNBs) is interrupted.

For example, the UE 802 may base its initial cell selection/reselection (e.g., to source eNB 804 illustrated in FIG. 8) on an enhanced capability of the source eNB 804 in addition to signal strength. For example, the UE 802 may receive system information (via SIBs) from one or more eNBs, determine support for one or more enhanced capabilities of one or more cells based on the system information, and evaluate cell selection/reselection criteria for the one or more cells based, at least in part, on support for the one or more enhanced capabilities. As another example, the UE 802 may transmit a measurement report to the source eNB 804 based, at least in part, on the enhanced capabilities of the target eNB 806. For example, as shown in FIG. 8, the transmission of the measurement report (step 2) may be based on criteria such as received signal strength, signal quality, path loss, etc. in addition to the enhanced capabilities of the target eNB 806 or based solely on the capabilities of the target eNB 806. In some cases, the UE 802 may alter reported values based on capabilities, for example, providing a bias to encourage handover to eNBs that support enhanced capabilities. In some cases, measurement may not be needed if the UE 802 has dual RF chain (e.g., the UE may be able to initiate handover without sending measurement reports-by performing a RACH at step 3). If the UE 802 has a single RF chain, the source/target eNB may specify a measurement gap for the UE 802 to perform a RACH with the target eNB 806 during the measurement gap.

According to certain aspects, the UE 802 or source eNB 804 may initiate a handover to the target eNB 806 based on one or more enhanced capabilities of the UE 802 and the target eNB 806. In some cases, the handover may be performed in a "make before break" (MBB) manner, meaning the connection to the source eNB 804 is not released until the connection is established with the target eNB 806. The UE 802 may use an additional RF chain or a single radio UE may use measurement gap (indicated by the source eNB 804 in step 2) to perform RACH or RRC connection setup with the target eNB 806.

For example, as shown in step 3 of FIG. 8, the UE 802 may initiate the handover by performing a random access procedure with the target eNB 806 while still connected to the source eNB 804. Put differently, using the techniques presented herein, the link between the UE 802 and the source eNB 804 may be kept active until the handover between the UE 802 and target eNB 806 is completed. In certain aspects, the random access procedure itself may be enhanced. For example, the random access procedure may be performed with a set of random access (RACH) preambles reserved for low latency access. For example, in one implementation, the target eNB 806 may reserve a separate set of dedicated RACH preambles designed to avoid contention during the enhanced random access procedure. The dedicated RACH preambles may be provided to the UE 802 based on its capabilities. For example, the separate set of preambles may be reserved for ULL operation, eCC and/or other enhanced capabilities. The separate set of dedicated RACH preambles may be conveyed from the source or target eNB to the UE 802 (e.g., through SIBs).

According to certain aspects, the UE 802 may not have to perform the random access procedure with the target eNB 806 in order to handover to the target eNB 806. Using the techniques presented herein, the UE 802 may skip the random access procedure, e.g., based on deriving or knowing the timing advance (TA) of the target cell, and establish a connection with the target base station based on the determined TA. For example, the UE 802 can know the time advance (TA) of the target cell (step 4) (e.g., the UE 802 can derive the information from one or more parameters sent from the target eNB 806, such as the eNB maximum transmission power, the position location of the target eNB, measured signal strength, etc). Based on deriving the TA in advance (e.g., as opposed to receiving the TA in step 4), the UE 802 may also send contention based PUSCH or send PRACH with data (e.g., including RRC Connection Request or RRC Connection Reestablishment Request, or RRC Connection Reconfigure Request) to the target eNB 806. In other words, by knowing the TA of the target cell in advance, there may be no need during the RACH procedure for the UE 802 to send random access preamble (Msg 1) to the target eNB 806 and receive random access response (Msg 2) from the target cell. In one example, if the target cell is a small cell (e.g., the source/target eNB can indicate the target cell is a small cell, such as a pico cell, femto cell or other small cell type, via SIBs), the UE 802 may not have to calculate or derive the TA of the target cell. For example, the UE 802 may assume that the TA is zero (or another value) or the UE 802 may receive an explicit indication (e.g., from the source eNB 804) that the UE 802 does not have to calculate the TA. This is another example of how, for small cells, use of the enhanced call flow (as compared to the call flow illustrated in FIG. 4) may significantly reduce the time associated with handover data interruption.

The enhanced call flow in FIG. 8 may also be enhanced (e.g., as compared to the call flow in FIG. 4) by including information to indicate make-before-break handover. In one aspect, the RRC Connection Reestablishment Request (step 5) may contain C-RNTI and/or various information that may be used to indicate make-before-break (MBB) handover. For example, the RCC Connection Reestablishment Request may include an explicit flag (e.g., "MBB HO") to indicate that the handover request is for a make-before-break handover. As another example, the make-before-break handover may implicitly be signaled through parameters such as buffer status report (BSR), QoS, etc. included within the RRC Connection Reestablishment Request.

Initiating the handover of the UE 802 from the source eNB 804 to the target eNB 806 while the UE 802 is still connected to the source eNB 804 may help reduce the data interruption time experienced by the UE 802 in the handover process. The interruption time may be reduced by performing steps 1-5 (described above) and by exchanging (e.g., via an x2 connection) some information (steps 6-8, described in more detail below) between the source eNB 804 and target eNB 806 (that the target eNB 806 will need to communicate with the UE 802) while the UE 802 is still connected to the source eNB 804 (and able to continue receiving and transmitting data from the source eNB 804).

For example, as shown in step 6 of FIG. 8, once the random access procedure is performed between the UE 802 and the target eNB 806, the target eNB 806 may request information regarding the context for the UE 802 (e.g., by indicating source cell PCI, source C-RNTI, short medium access control (MAC) ID, etc.). In response (e.g., after verifying the information in the UE context request), as shown in step 7, the source eNB 804 may provide the information regarding the UE context to the target eNB 806. The source eNB 804 may also provide (in step 11) information regarding the SN status to the target eNB 806. In some cases, the information may be provided via the handover request message transmitted in step 7.

After receiving the handover request message, as shown in step 8, the target eNB 806 may transmit a handover request ACK to the source eNB 804. As shown in steps 6-8, the messages that are transmitted between the source eNB 804 and target eNB 806 may be transmitted via a X2 interface between the eNBs. Upon receiving the step 8 from the target eNB 806, the source eNB 804 may send the last RLC PDU to the UE 802. The source eNB 804 may send RRC Connection Reconfigure (for example, handover command) to the UE 804 at step 9.

The handover command message may be transmitted, at step 9, via a common control channel (CCCH) or downlink-shared channel (DL-SCH). After step 8, the target eNB 806 sends Path Switch Request to the MME 808 at step 10, and then the MME 808 sends Modify Bearer Request to the S-GW 810 to switch down link path at step 12. Upon receipt of the handover command message, the UE 802 may reset the MAC layer and RLC layers, and re-establish PDCP for signaling radio bearer (SRB) 1, SRB2, and all data radio bearers (DRBS), at step 15.

In step 14, the source eNB 804 may forward remaining EPS bearer data to the target eNB 806. In step 16, the UE 802 may complete the handover procedure by transmitting a RRC connection Reconfigure complete message to the target eNB 806 via a dedicated control channel (DCCH) or uplink-shared channel (UL-SCH), providing an indication to the target eNB 806 that the UE 802 is ready to communicate directly with the target eNB 806 (e.g., and exchange RLC PDUs). The target eNB 806 may start to send data to the UE 802 if there is any data forwarded from the source eNB 804 at the step 14. Upon deciding to switch DL path to the target eNB 806 at step 13, the S-GW 810 sends one or more "end marker" packets on the old path to the source eNB 804 and then can release resources from S-GW 810 towards the source eNB 804. The source eNB 804 forwards "end marker" packets to the target eNB 806 at step 17. The S-GW 810 starts to send the packet data to the target eNB 806 which will be sent to the UE 802. The S-GW 810 then sends a Modify Bearer Response message to the MME 808 at Step 19. The MME 808 confirms the Path Switch Request message with the Path Switch Request Ack message at step 20. At the step 21, by sending the UE Context Release message, the target eNB 806 informs success of HO to source eNB 804 and triggers the release of resources by the source eNB 804. The target eNB 806 sends UE Context Release message after the Path Switch Request Ack message is received from the MME 808.

Figure 9:
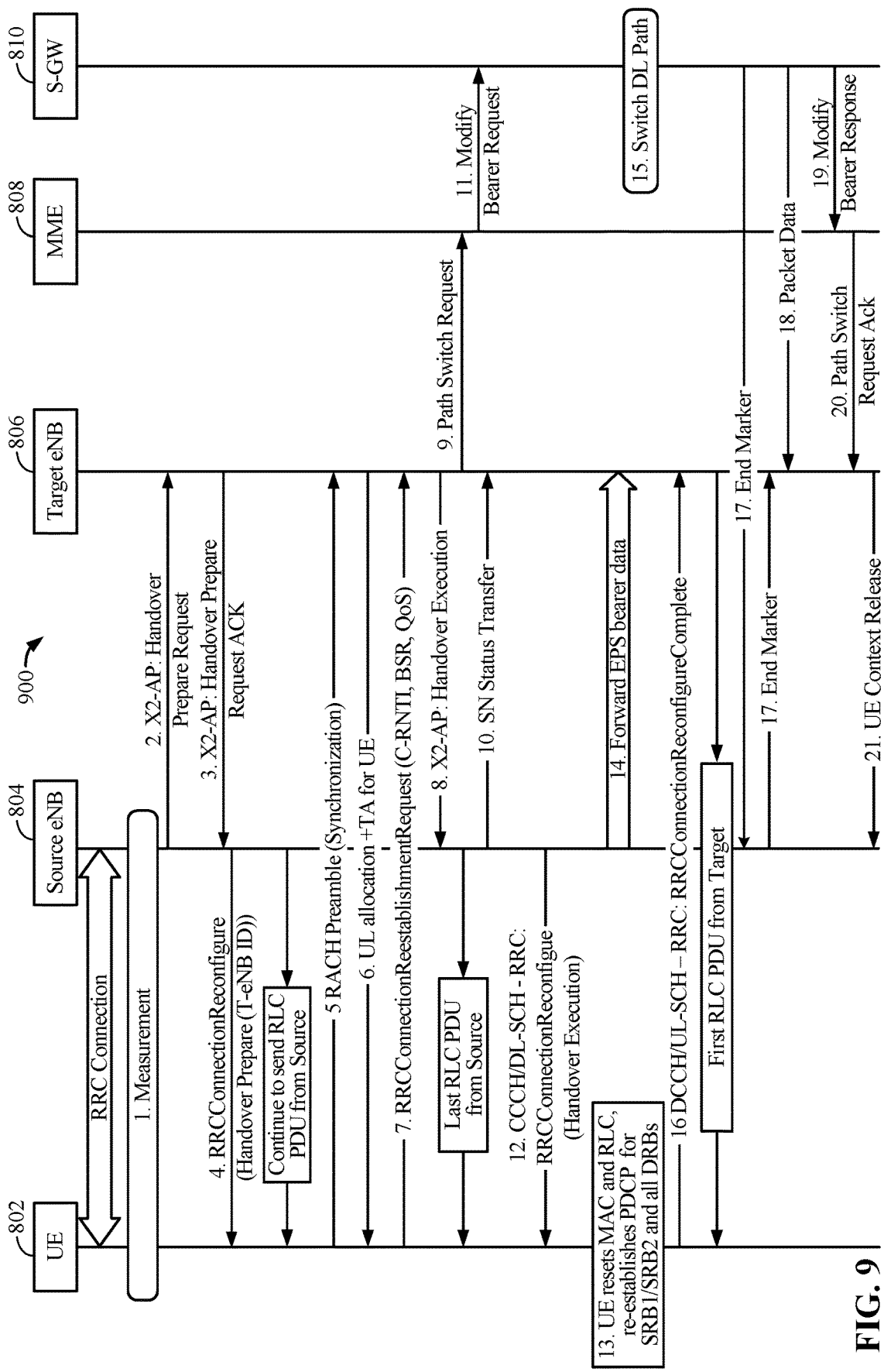

FIG. 9 illustrates an example enhanced call flow 900 for performing one or more handover-related procedures by one or more devices (e.g., UE, source eNB, target eNB, etc.) in accordance with aspects of the present disclosure. The call flow 900 may be considered a "network-based" solution, for example, with the handover initiated by the source eNB 804 (e.g., based on a measurement report from the UE and/or knowledge of enhanced capabilities of the UE and target eNB). Operations that are labeled the same (or similar) as those in FIG. 8 may be performed as described above and, as such, may not be described again. For example, as illustrated, the target eNB 806 may communicate with the MME 808 and S-GW 810 as described above with reference to FIG. 8 (e.g., with operations 9, 11, 15, and 18-20 of FIG. 9 corresponding to operations 10, 12, 13, and 18-20 of FIG. 8).

Again, the UE 802 may indicate its support for one or more enhanced capabilities to at least one BS/eNB (e.g., during RRC connection establishment and may provide measurement reports at step 1). Rather than the UE 802 initiating a handover (e.g., by initiating the RACH procedure as shown in FIG. 8), the source eNB 804 may initiate the handover, for example, by sending a Handover Prepare Request to the target eNB 806 (at step 2). In the Handover Prepare Request message, the source eNB 804 may also provide the information regarding the UE context to the target eNB 806. The target eNB 806 may respond with a Handover Prepare Request ACK (at step 3). After receiving the ACK, the source eNB 804 may send a RRC Connection Reconfigure message with Handover Prepare request indicator to the UE 802 (step 4), while continuing to send RLC PDUs to the UE 802.

In response to the Handover Prepare request, the UE 802 may perform a RACH procedure with the target eNB 806 as described above (e.g., with steps 5-7 of FIG. 9 corresponding to steps 3-5 of FIG. 8). As noted above, the UE 802 may be provided with dedicated RACH preambles for a contention-free RACH procedure. For example, the target eNB 806 may provide the dedicated preambles to the source eNB 804 via the Handover Prepare Request ACK (step 3) and the source eNB 804 may convey the dedicated preambles to the UE 802 via the Handover Prepare Request (step 4).

After the RACH procedure, the target eNB 806 may send a Handover Execution message to the source eNB 804 (at step 8). This message may prompt the source eNB 804 to take final action to prepare the UE 802 and target eNB 806 for the handover.

For example, in response (e.g., after verifying the information in the UE context request), the source eNB 804 may send the its last RLC PDU to the UE 802 and may provide information regarding the SN status to the target eNB 806 (at step 10). The source eNB 804 then sends RRC Connection Reconfigure with handover execution indicator to the UE 802 at step 12. The handover execution indicator may signal the reconfiguration is for a handover to the target eNB 806 having enhanced capabilities and, in some cases, may trigger the UE 802 to prepare to receive data from the target eNB 806.

For example, upon receipt of the handover command message, the UE 802 may reset the MAC layer and RLC layers, and re-establish PDCP for signaling radio bearer (SRB) 1, SRB2, and all data radio bearers (DRBS), at step 13. In step 14, the source eNB 804 may forward remaining EPS bearer data to the target eNB 806.

In step 16, the UE 802 may complete the handover procedure by transmitting a RRC connection Reconfigure complete message to the target eNB 806, providing an indication to the target eNB 806 that the UE 802 is ready to communicate directly with the target eNB 806 (e.g., and exchange RLC PDUs). The target eNB 806 may start to send data to the UE 802 if there is any data forwarded from the source eNB 804 at the step 14. Upon deciding to switch DL path to the target eNB at step 15, the S-GW 810 sends one or more "end marker" packets on the old path to the source eNB 804, at step 17, which can, in turn forward one or more end marker packets to the target eNB 806.

As described above, the S-GW 810 starts to send the packet data to the target eNB 806 which will be sent to the UE 802. The S-GW 810 then sends a Modify Bearer Response message to the MME 808 at Step 19. The MME 808 confirms the Path Switch Request message with the Path Switch Request Ack message at step 20. At step 21, by sending the UE Context Release message, the target eNB 806 informs success of HO to source eNB 804 and triggers the release of resources by the source eNB 804. The target eNB 806 sends UE Context Release message after the Path Switch Request Ack message is received from the MME 808.

Figure 10:
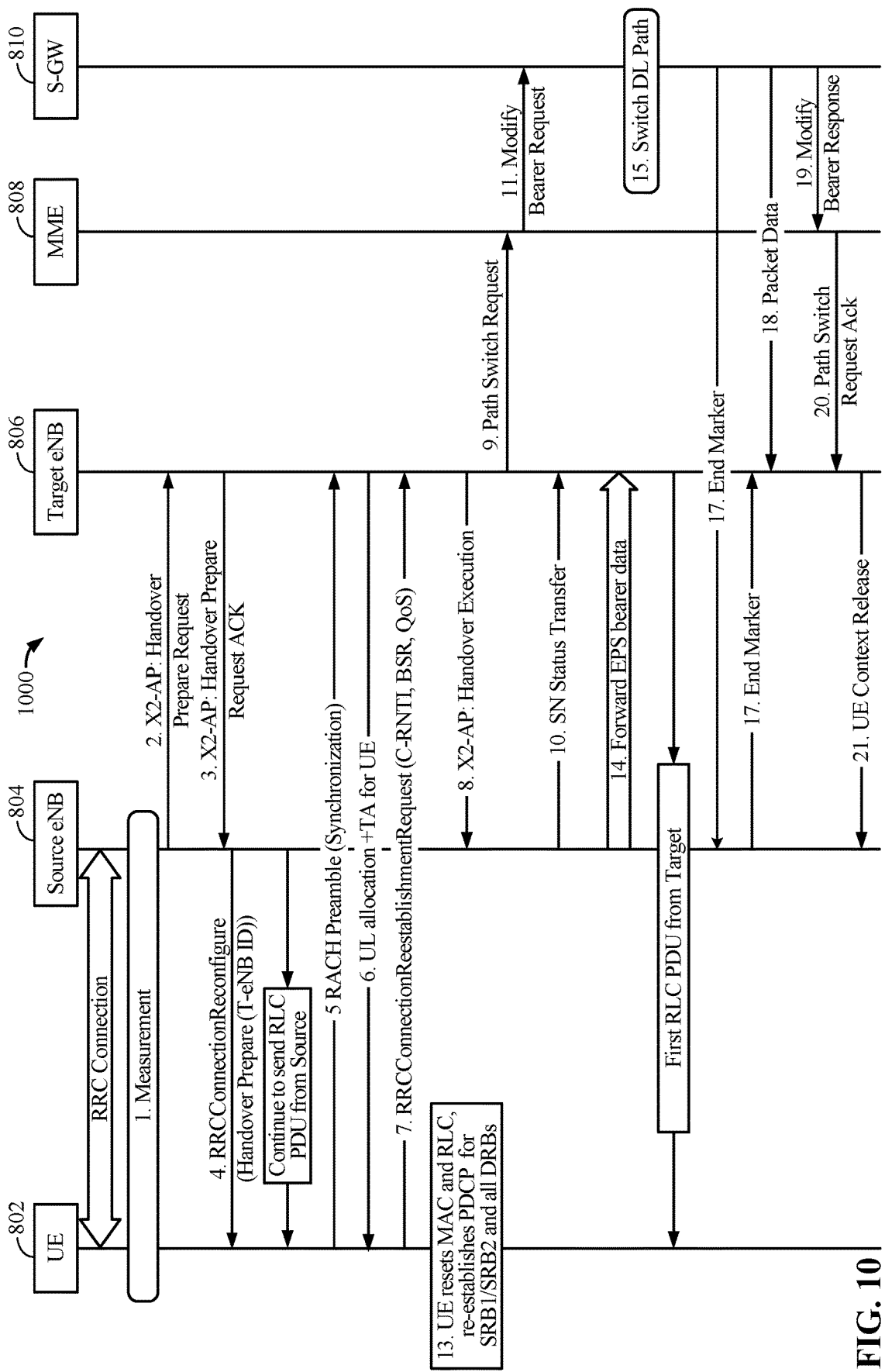

FIG. 10 illustrates an alternative "network-based" solution, similar to FIG. 9, where the handover may be initiated by the source eNB. As illustrated in FIG. 10, the Handover Prepare Message, at step 4, may be sent from the source eNB 804 to the UE 802 via an RRC Connection Reconfigure message (indicating the target eNB 806). As a result, after performing the RACH procedure with the target eNB 806, rather than send an RRC Connection Reestablishment Request (as illustrated in FIG. 9), the UE 802 may already be able to send an RRC Connection Reconfigure Complete Message, at step 7, signaling it is ready to communicate with the target eNB 806 (after the UE resets the MAC layer and RLC layers, and re-establishes PDCP for signaling radio bearer SRB 1, SRB2, and all DRBS, at step 13).

During handover period shown in FIGS. 8 to 10, the UE 802 may also keep dual connectivity to both source and target eNB for traffic data as well. In other words, in addition to keeping connection to the source eNB 804 while performing RACH procedure with the target eNB 806, the UE 804 may continue keeping a connection to both source and target eNB for RLC data transmission until the UE 802 is completely handover to the target eNB 806.

In certain aspects, the enhanced handover call flow (e.g., illustrated in FIGS. 8-10) may be used to handoff a ULL/eCC capable UE to a ULL/eCC capable target eNB. In other aspects, the enhanced handover call flow (e.g., illustrated in FIG. 8) may also be used to handoff a ULL/eCC capable UE to a non-ULL/eCC capable target eNB, which as described in more detail below may involve a reduction in QoS requirement.

According to aspects, the one or more handover-related procedures (e.g., performed by the UE 802, source eNB 804 and target eNB 806 in FIG. 8) may also include participation in a QoS negotiation. For example, the target eNB may participate in a QoS negotiation based, at least in part, on the enhanced capabilities of the target eNB and the UE. As another example, the UE, source eNB and target eNB may participate in a QoS negotiation based, at least in part, on support for the one or more enhanced capabilities of the UE at the target eNB.

The UE 802 may participate in the QoS negotiation with the target eNB 806 by transmitting a QoS request to the target eNB 806 with a RRC connection reestablishment request (e.g., illustrated in step 5 of FIG. 8). According to certain aspects, by transmitting the QoS request with the RRC connection reestablishment request (e.g., as opposed to after RRC reestablishment in steps 7 and 10 of FIG. 8), the amount of time required for successful QoS negotiation may be reduced. In certain aspects, the source eNB 804 may also transmit the QoS request to the target eNB 806 with the handover request message (e.g., in step 7 of FIG. 8) in order to reduce the time associated with QoS negotiation.

In some cases, the QoS negotiation may support one or more QoS levels and/or models for particular applications (e.g., such as online gaming, video streaming, industry automation, etc.) based on support for one or more enhanced capabilities of the target eNB. In one aspect, the UE may accept a first QoS for a particular application (e.g., such as online gaming, industry automation etc.) if the target eNB has eCC capability or a second QoS (lower than the first QoS) for the particular application, if the target eNB lacks eCC capability. For example, in one model, for an online gaming application or similar application, the UE may be able to support a lower QoS for the online gaming application if eCC is not supported. In another model, the UE may stop the online gaming application if eCC is not supported.

According to certain aspects, additional granularities for bearer level QoS control may be provided to achieve the QoS requirements (e.g., under ULL/eCC). For a UE initiated QoS negotiation, the UE may request bearer resource modifications with new QoS through non-access stratum (NAS) signaling. For a network initiated QoS negotiation (e.g., via the target eNB), the target eNB may schedule one or more enhanced capabilities (e.g., eCC/uLL, etc.) based on the new QoS requirement and enhanced capabilities of the UE.

Techniques provided herein may also provide for reducing the time associated with setup of the dedicated bearer(s). For example, in some cases, for a non-guaranteed bit rate (GBR) bearers (e.g., which are typically used for applications such as web browsing, etc.) the non-GBR bearer may be setup at attachment. In certain aspects, however, for GBR bearers, performing a QoS negotiation may allow for fast bearer setup.

According to certain aspects, the QoS negotiation (e.g., between the UE and the target eNB) may involve more than one QoS class identifier (QCI) based, at least in part, on the enhanced capabilities of the UE and the target eNB. For example, the UE may indicate (to the target eNB) more than one QCI based, at least in part, on the enhanced capabilities of the UE and the target eNB. Similarly, the target eNB may receive (from the UE) more than one QCI based, at least in part, on the enhanced capabilities of the UE and the target eNB.

According to certain aspects, the QoS negotiation may involve adding a QCI which indicates alternative QoS requirements. For example, the QoS negotiation (e.g., between the UE and target eNB) may involve the UE indicating to the target eNB (and the target eNB receiving from the UE) alternative QoS requirements. In one implementation (e.g., for an application involving industry automation), a QCIx may indicate the packet delay budget can be 200 microseconds (us), 500 us, 1000 us, which may indicate that the first preference is to achieve a 200 us delay but that the application may tolerate 1000 us (or 1 ms) at maximum.

According to certain aspects (e.g., for an application involving real time online gaming), a QCIy may indicate the packet delay budget can be 20 ms, 50 ms, 100 ms, which may indicate that the first preference is to achieve a 20 ms delay but that the application may tolerate 100 ms at maximum. In general, however, although three alternative QoS requirements are described, aspects presented herein may provide for any number of alternative QoS requirements indicated by the additional QCI.

According to certain aspects, the QoS negotiation (e.g., between the UE and target eNB) may involve indicating the alternative QoS requirements in order of preference. For example, with respect to the implementations described above, the UE may specify (for the industry automation application) a QCIx1=200 us, QCIx2=500 us and a QCIx3=1000 us. Similarly, for the online gaming application, the UE may specify a QCIy1=20 ms, QCIy2=50 ms and a QCIy3=100 ms.

The techniques described herein (e.g., with reference to FIGS. 5-8) may help reduce latency associated with certain handover-related procedures (e.g., such as handover, QoS negotiation, cell selection/reselection, etc.) in a wireless communication network.

The various operations of methods described above may be performed by any suitable means capable of performing the corresponding functions. The means may include various hardware and/or software component(s) and/or module (s), including, but not limited to a circuit, an application specific integrated circuit (ASIC), or processor.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication by a user equipment (UE), comprising:
    signaling, by the UE, one or more enhanced capabilities of the UE to at least one source base station; and
    performing, by the UE, one or more handover-related procedures based, at least in part, on the one or more enhanced capabilities of the UE and support for the one or more enhanced capabilities of the UE at a target base station, comprising:
        determining, by the UE, a timing advance (TA) of the target base station, based on one or more parameters of the target base station;
        skipping, by the UE, a random access procedure with the target base station; and
        establishing, by the UE, a connection with the target base station based on the TA, after skipping the random access procedure, wherein the one or more enhanced capabilities of the UE comprise at least one of:
            a capability of the UE to perform handover with low latency relative to devices that lack the one or more enhanced capabilities; or
            a capability of the UE to support enhanced component carrier (eCC) operation.

2. The method of claim 1, wherein the one or more parameters comprise at least one of a transmission power of the target base station, a location of the target base station, or a signal strength of the target base station.

3. The method of claim 1, further comprising receiving, by the UE, an indication that the target base station corresponds to a small cell type, wherein determining the TA of the target base station is based further upon the indication.

4. The method of claim 3, wherein the TA of the target base station is zero.

5. The method of claim 1, wherein:
    performing the one or more handover-related procedures further comprises participating, by the UE, in a Quality of Service (QoS) negotiation with the target base station based in part on the support for the one or more enhanced capabilities of the UE at the target base station; and
    participating in the QoS negotiation with the target base station comprises transmitting, by the UE, a radio resource control (RRC) connection reestablishment request comprising a QoS request to the target base station.

6. The method of claim 5, wherein participating in the QoS negotiation further comprises accepting, by the UE, a first QoS when the target base station has a capability to support eCC operation or accepting, by the UE, a second QoS, lower than the first QoS, when the target base station lacks a capability to support eCC operation.

7. The method of claim 5, wherein participating in the QoS negotiation further comprises requesting, by the UE, bearer resource modifications with new QoS through Non-Access Stratum (NAS) signaling.

8. The method of claim 5, wherein participating in the QoS negotiation further comprises indicating, by the UE, more than one QoS class identifier (QCI) based at least in part on the one or more enhanced capabilities of the UE.

9. The method of claim 5, wherein participating in the QoS negotiation further comprises indicating, by the UE, alternative QoS requirements in an order of preference.

10. The method of claim 1, further comprising receiving, by the UE, an indication of support for the one or more enhanced capabilities of the UE at the target base station.

11. The method of claim 1, wherein performing the one or more handover-related procedures further comprises initiating, by the UE, a handover to the target base station.

12. The method of claim 1, wherein performing the one or more handover-related procedures further comprises transmitting, by the UE, a measurement report to the at least one source base station based, at least in part, on support for the one or more enhanced capabilities of the UE at the target base station.

13. The method of claim 1, wherein determining the TA of the target base station comprises deriving, by the UE, the TA of the target base station based on the one or more parameters of the target base station.

14. A method of wireless communication by a source base station, comprising:
    receiving an indication of one or more enhanced capabilities of a user equipment (UE);
    determining support for the one or more enhanced capabilities of the UE at a target base station; and
    performing one or more handover-related procedures to handover the UE from the source base station to the target base station based, at least in part, on the one or more enhanced capabilities of the UE and the support for the one or more enhanced capabilities of the UE at the target base station, wherein:

performing the one or more handover-related procedures comprises participating in a Quality of Service (QoS) negotiation based in part on the support for the one or more enhanced capabilities of the UE at the target base station;

participating in the QoS negotiation comprises transmitting, to the target base station, a handover request comprising a QoS request that indicates a plurality of QoS class identifiers (QCIs) if the determination is that the one or more enhanced capabilities of the UE are supported at the target base station, wherein at least one of the plurality of QCIs indicates a plurality of alternative QoS requirements; and the one or more enhanced capabilities of the UE comprise at least one of:
 a capability of the UE to perform the handover with low latency relative to devices that lack the one or more enhanced capabilities; or
 a capability of the UE to support enhanced component carrier (eCC) operation.

15. The method of claim 14, wherein performing the one or more handover-related procedures further comprises initiating the handover of the UE to the target base station while the UE is connected to the source base station.

16. A method of wireless communication by a target base station, comprising:
 receiving an indication of one or more enhanced capabilities of a user equipment (UE); and
 performing one or more handover-related procedures to handover the UE from a source base station to the target base station based, at least in part, on the one or more enhanced capabilities of the UE and support for the one or more enhanced capabilities of the UE at the target base station, wherein:
  performing the one or more handover-related procedures comprises participating in a Quality of Service (QoS) negotiation with the UE based in part on the support for the one or more enhanced capabilities of the UE at the target base station;
  participating in the QoS negotiation with the UE comprises receiving, from the UE, a radio resource control (RRC) connection reestablishment request comprising a QoS request that indicates a plurality of QoS class identifiers (QCIs), wherein at least one of the plurality of QCIs indicates a plurality of alternative QoS requirements; and
  the one or more enhanced capabilities of the UE comprise at least one of:
   a capability of the UE to perform the handover with low latency relative to devices that lack the one or more enhanced capabilities; or
   a capability of the UE to support enhanced component carrier (eCC) operation.

17. The method of claim 16, wherein performing the one or more handover-related procedures further comprises performing a random access procedure with the UE while the UE is connected to the source base station.

18. The method of claim 17, wherein the random access procedure comprises a random access channel (RACH) preamble reserved for low latency access.

19. The method of claim 16, wherein participating in the QoS negotiation further comprises receiving a request for bearer resource modifications with new QoS through Non-Access Stratum (NAS) signaling.

20. The method of claim 16, wherein the alternative QoS requirements are indicated in an order of preference.

21. A user equipment (UE), comprising a transmitter, at least one processor and a memory coupled to the at least one processor with instructions stored thereon, wherein the at least one processor is configured to:
 indicate, via the transmitter, one or more enhanced capabilities of the UE to at least one source base station; and
 perform one or more handover-related procedures based, at least in part, on the one or more enhanced capabilities of the UE and support for the one or more enhanced capabilities of the UE at a target base station by:
  determining a timing advance (TA) of the target base station, based on one or more parameters of the target base station;
  skipping a random access procedure with the target base station; and
  establishing a connection with the target base station based on the TA, after skipping the random access procedure, wherein the one or more enhanced capabilities of the UE comprise at least one of:
   a capability of the UE to perform handover with low latency relative to devices that lack the one or more enhanced capabilities; or
   a capability of the UE to support enhanced component carrier (eCC) operation.

22. The UE of claim 21, wherein the at least one processor is configured to determine the TA of the target base station by deriving the TA of the target base station based on the one or more parameters of the target base station.

* * * * *